US007584032B2

(12) United States Patent
Bauman et al.

(10) Patent No.: US 7,584,032 B2
(45) Date of Patent: Sep. 1, 2009

(54) METHOD AND SYSTEM FOR DYNAMIC COLLECTION OF FLIGHT TEST DATA

(75) Inventors: Aaron M. Bauman, Rio Rancho, NM (US); Alexander D. Geiger, Albuquerque, NM (US); Matthew T. Greenfelder, Albuquerque, NM (US); Eduardo G. Sy, Rio Rancho, NM (US)

(73) Assignee: Honeywell International Inc., Morristown, NJ (US)

( * ) Notice: Subject to any disclaimer, the term of this patent is extended or adjusted under 35 U.S.C. 154(b) by 884 days.

(21) Appl. No.: 10/979,417

(22) Filed: Nov. 2, 2004

(65) Prior Publication Data

US 2005/0283287 A1 Dec. 22, 2005

Related U.S. Application Data

(60) Provisional application No. 60/580,669, filed on Jun. 17, 2004.

(51) Int. Cl.
*G01M 17/00* (2006.01)
(52) U.S. Cl. .......................................... 701/35; 701/14
(58) Field of Classification Search .................... 701/3, 701/35, 36, 29, 14; 340/500, 507, 525
See application file for complete search history.

(56) References Cited

U.S. PATENT DOCUMENTS

| 5,465,211 | A | 11/1995 | Byrne, Jr. |
| 5,908,485 | A | 6/1999 | Germanetti |
| 6,115,656 | A * | 9/2000 | Sudolsky ..................... 701/35 |
| 6,298,318 | B1 | 10/2001 | Lin |
| 2002/0111720 | A1 | 8/2002 | Holts et al. |

OTHER PUBLICATIONS

SBS Technologies Product Description, 1553 PASS-1000; http://www.sbs.com/products/311; Jun. 24, 2004.
PCT International Search Report PCT/US2005/021842; Nov. 8, 2005.

* cited by examiner

*Primary Examiner*—Richard M. Camby
(74) *Attorney, Agent, or Firm*—McDonnell Boehnen Hulbert & Berghoff LLP

(57) ABSTRACT

A method and system for dynamically selecting and retrieving real-time data from a time/space partitioned flight computer system located on board an aircraft. The system used to implement this method consists of an on-board memory read-out device attached to a serial data bus capable of communicating with the flight computer and/or a ground-based memory read-out device capable of communicating with the flight computer via radio telemetry. This data consists of any valid memory location within the flight computer, including but not limited to flight data, aircraft status, and flight computer state.

21 Claims, 2 Drawing Sheets

METHOD AND SYSTEM FOR DYNAMIC COLLECTION OF FLIGHT TEST DATA

CROSS-REFERENCE TO RELATED APPLICATIONS

This application is based on U.S. Provisional Application Ser. No. 60/580.669. entitled "Method and System for Collection of Dynamic Flight Test Data", filed on Jun. 17, 2004. the teachings of which are incorporated herein by reference.

BACKGROUND OF THE INVENTION

1. Field of the Invention (Technical Field)

The present invention relates to aerospace aviation and more particularly to a method and apparatus for dynamically displaying test flight data.

2. Background Art

Test flight data is currently not readily available for dynamic display on aircraft or for relay via radio telemetry without cumbersome and expensive equipment. The traditional cycle of configuring test parameters, taking these to flight for execution, and performance of post flight data analysis is necessary, but insufficient to integrate and verify complex modern systems in a cost-effective manner. Diagnostic procedure complexity is hindered by physical space/memory available for test data collection. Since the adoption of advanced processing equipment on-board aircraft the need for dynamic data collection has existed and will continue to escalate with increased sophistication of the aircraft computing systems.

A prior art system, which collects flight data that is preprogrammed on the ground in the 1553 PASS-1000, from SBS Technologies. This system requires a large pallet of flight test data equipment. In utilizing this system, the users must fly the aircraft again with a different set of data variables to change parameters. The recording equipment is costly, cumbersome, and impractical for space-limited aircraft. In addition, flight test is constrained to the number of pallets of equipment available.

The 1553 PASS-1000 is an avionics bus analyzer. It is a collection of software and hardware (system) that allows for recording of bulk data on an avionics bus. The present invention differs from the prior art, in that the data being output of the serial avionics bus is dynamically user selectable, by communicating to the resident application on the flight computer. The 1553 PASS-1000 on the other hand is static in nature, more along the lines of a data recorder.

The present invention provides a dynamic means for memory read-out and persistence (on-board or remote) of flight data and utilizes a standard interface to a Read Access Partition of a flight computer to enable in-flight test data output. Within this superiority, the invention can be (re)programmed in-flight which will enable real-time decisions concerning both test scenario suite and the content of collected data by delivering light-weight hardware needs which maximizes the possible target aircraft and allows commercial off-the-shelf components to maintain a low deliverable cost by promoting rapid acceptance. This strategy is also portable across any ARNIC-653 compliant flight computer system, and is extendible to support radio telemetry initiated configurations. Monitoring flight data on an airborne aircraft via an on-board device connected to one or more serial data busses is a current practice in the avionics industry. However, the ability to dynamically select what data is being collected is a novel and unique concept. Also, the use of an external MRO device, communicating with the flight computer via radio broadcasts and collecting/displaying data on the ground during a flight test is novel to this design.

SUMMARY OF THE INVENTION (DISCLOSURE OF THE INVENTION)

The invention is a method and system for dynamically selecting and retrieving real-time data from a time/space partitioned flight computer system located on board an aircraft. Collecting this information is achieved by allowing a user to specify an address in a flight computer's main memory, submit a request to the flight computer to display the contents of that memory, and receive a response describing the memory contents. The system is based around a memory read out device, capable of submitting memory read out (MRO) requests to and reading the MRO response messages from the flight computer. The MRO device preferably has an interface to the flight computer, whether by being connected via a serial data bus directly to the flight computer, or by means of radio communications allowing for the device to be remotely located from the aircraft. The system preferably has a read-access partition within the flight computer, which has read access to the main memory of the flight computer, and is capable of processing and responding to the MRO messages submitted by the memory read out device. The system also preferably has a communications management partition within the flight computer for radio communications. The communications management partition must have the ability to receive and broadcast radio transmissions from and to a ground station, and a message system allowing it to communicate with the read-access partition.

A primary object of the present invention is to provide a system and method to dynamically determine flight test data composition.

A primary advantage of the present invention is that it is more cost effective than existing solutions.

Another advantage of the present invention is that it is easier to use than many existing solutions.

Yet another advantage of the present invention is that it uses commercial off the shelf components.

Another advantage of the present invention is that it relies on minimal additional hardware so it is environmentally conscious.

Another advantage of the present invention is that it enables a shorter test/investigation cycle time.

Another advantage of the present invention is that it has a low adoption cost and therefore customers will enjoy a rapid return on investment when the premium cost of flight test time is considered.

Another advantage of the present invention that the minimal required equipment adds negligible weight to the aircraft.

Another advantage of the present invention is that the off-the-shelf components are inherently less expensive and easier to fix/maintain.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

BEST MODES FOR CARRYING OUT THE INVENTION

Figure 1:
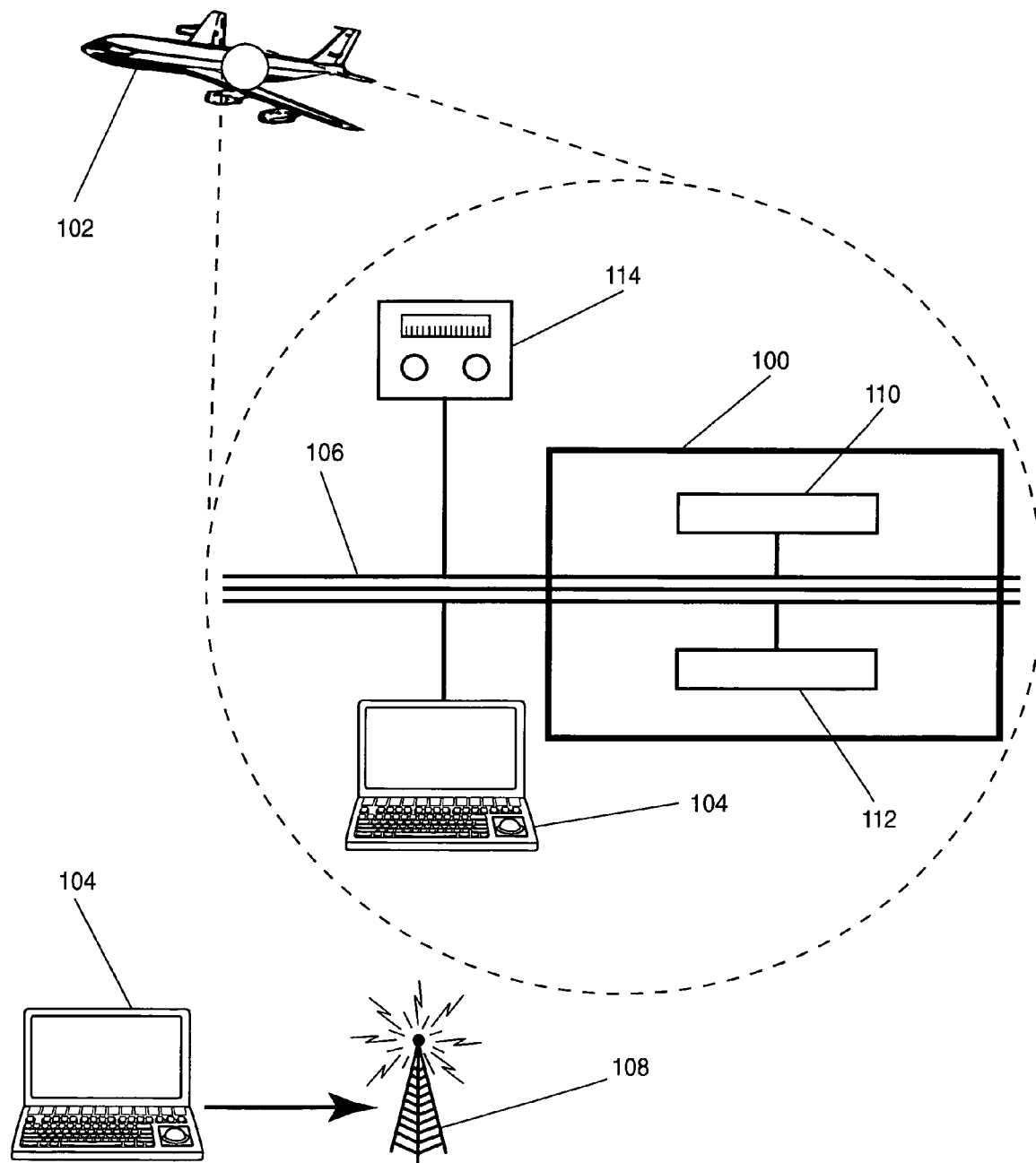
FIG. 1 is a system diagram of the preferred embodiment of the invention.

The present invention is a method and system for dynamically selecting and retrieving real-time data from a time/space partitioned flight computer system 100 located on board an aircraft 102, as shown in FIG. 1. In order to further define the system and method disclosed for this invention a brief explanation of the components is necessary.

Flight computer 100 preferably is a time/space partitioned computer system running aboard an aircraft, monitoring and computing various flight data. This computer's main memory contains information that a user wishes to analyze, specifically in a dynamic real-time environment (such as monitoring several different data values during a test flight). A read-access Arinc-653 partition resides on the flight computer; this partition communicates with the PC based software connected to the flight computer via a serial data bus. Neither the read only partition nor the PC based software application rely on commercial algorithms, rather they use internally developed methods and algorithms to manipulate the data.

Aircraft 102 is equipped with flight computer 100, which conducts various test flight plans in an number of configurations, in an attempt to verify aircraft's 102 and/or flight computer's 100 mission-readiness and/or capabilities. This apparatus is the source of all data that is being examined/recorded by the user.

MRO device 104 allows a user to dynamically select various address locations in fight computer's 100 main memory, and display the contents of these addresses in real-time. This apparatus is the means by which the user interacts with the entire system.

Serial data bus 106 is connected to flight computer 100. This is the means by which any MRO request is submitted to flight computer 100, whether from an on-board MRO device connected to the serial data bus 106 or a ground-based device communicating with ground station 108 connected to serial data bus 106.

Ground station 108 is a ground-based radio communications system, capable of communicating with (submitting and receiving radio messages) aircraft's 102 on-board radio communications device. This is the means by which MRO device 104 communicates with flight computer 100.

Read access partition 110 is a partition within flight computer 100, which has read-access available to it for the flight computer's main memory. This is the software within flight computer 100 that is able to retrieve the contents of the memory locations specified in the MRO requests submitted by a user.

Communications management partition 112 is a partition within flight computer 100, which is capable of communications with aircraft radio communications device 114, as well as communications with read access partition 110. This is the software within flight computer 100 that relays MRO requests submitted by MRO device 104 to read access partition 110, after they are received by aircraft radio communications 114. This software also relays MRO response messages from read access partition 110 to aircraft radio communications 114, for transmission to memory read out device 104.

Aircraft radio communications 114 is a device or collection of devices, comprised of an on-board radio system capable of communicating with ground stations 108, which is also wired into flight computer's 100 serial data bus 106. Aircraft radio communications 114 is accessible by communications management partition 112, and can relay messages to and from the partition to ground station 108.

Memory read out device 104 physically interfaces to flight computer 100 by being connected via serial data bus 106 directly to flight computer 100, or via telemetry by means of aircraft radio communications 114.

For direct connection, the software application running on an on-board memory readout device (i.e. notebook PC or the like) transmits a memory readout request over the interface to read access partition 110 within flight computer 100. The read access partition 110 reads the memory locations of flight computer 100 specified in the MRO request, and transmits a response over the interface to the memory read out device 104.

The system also preferably has a communications management partition 112 within flight computer 100 for radio communications. Communications management partition 112 functions transparently between a remote, ground-based memory read out device 108 and the flight computer read access partition 110. The ground-based MRO requests are transmitted by proxy, via communication management partition's 112 physical interface, to flight computer 100. The resulting response can be relayed to the ground-based MRO device by the radio communications hardware.

The system is based around memory read out device 104, capable of submitting MRO requests to and reading the MRO response messages from flight computer 100. The MRO device preferably contains an interface to flight computer 100, whether by being connected via a serial data bus 106, or by means of radio communications, for instance from a ground station radio 108, allowing for the device to be remotely located from the aircraft 102. The system preferably has a read-access partition 110 within flight computer 100, which has read access to the main memory of flight computer 100, and is capable of processing and responding to the MRO messages submitted by the MRO device. The system also preferably contains a communications management partition 112 within flight computer 100 for radio telemetry-based requests/responses. This communications partition 112 must have the ability to receive and broadcast radio transmissions to and from a ground station via an on-board radio 114, and a message system allowing it to communicate with read-access partition 110.

The serial data bus 106 and the ground station radio communications 108 both represent interface methods. While either could be used independently and maintain conceptual consistency, the inclusion of both wired and wireless communication in the graphical model is used to clarify the breadth of the invention.

Flight computer 100 is located aboard a flight test aircraft 102. The goal is to access information inside the flight computer's memory, including but not limited to flight data, flight computer status data, etc., in a dynamic fashion using an external MRO device 104. The memory access is achieved by connecting MRO device 104 to flight computer 100 via an on-board serial data bus 106 or through the use of a ground-based radio station 108 combined with an on-board radio 114.

In the case of an on-board MRO device 104, a message system will allow the device to communicate directly with a read access partition 110 via serial data bus 106. This read access partition 110 will have read-access to flight computer's 100 main memory. The message system will allow MRO device 104 to submit MRO requests to read access partition 110, and will allow read access partition 110 to submit MRO responses to MRO device 104. MRO requests will specify an exact memory location, or series of memory locations, for read access partition 110 to examine. MRO responses will contain the current contents of the memory location(s) specified in the MRO request.

In the case of an on-ground MRO device 104, a message system will allow the device to communicate with communications management partition 112, via a ground station's 108 radio and the aircraft's on-board radio equipment. This message system will allow MRO device 104 to submit MRO requests to communications management partition 112, and allow communications management partition 112 to submit MRO responses to MRO device 104. Communications management partition 112 will have a message system available to it allowing it to forward the MRO requests it receives from MRO device 104 on to read access partition 110. This message system will also allow read access partition 110 to submit MRO responses to communications management partition 112, for it to forward them to MRO device 104.

The system is based around MRO device 104, capable of submitting MRO requests to and reading the MRO response messages from flight computer 100. MRO device 104 preferably contains an interface to flight computer 100, whether by being connected via a serial data bus 106 directly to flight computer 100, or by means of radio communications allowing for the device to be remotely located from aircraft 102, such as ground station radio communications 108. The system preferably has read-access partition 110 within flight computer 100, which has read access to the main memory of flight computer 100, and is capable of processing and responding to the MRO messages submitted by MRO device 104. For radio communications, the system also preferably has communications management partition 112 within flight computer 100. Communications management partition 112 preferably has the ability to receive and broadcast radio transmissions to and from a ground station via an on-board radio 114, and a message system allowing it to communicate with read-access partition 110.

Figure 2:
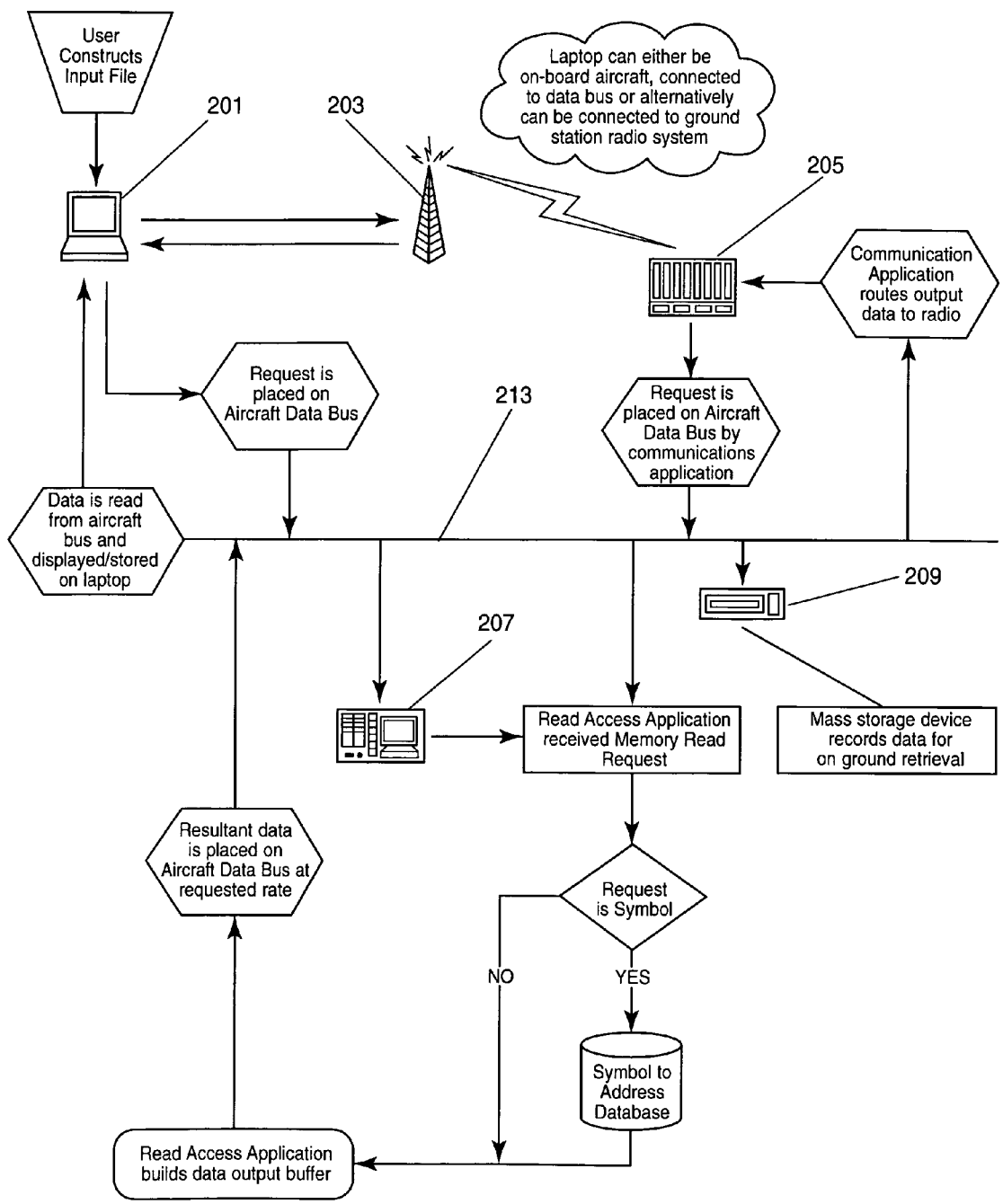
FIG. 2 is a flow chart showing the preferred method of the invention.

FIG. 2 is a flow chart showing the preferred method of the invention. The steps involved are equivalent for radio telemetry access or submission of memory readout requests by an on-board device. Initially a read access request is placed on serial data bus 213. For an on-board device scenario memory readout device 201 is physically connected to serial data bus 213. Memory readout device 201 places a MRO request directly on serial data bus 213.

For a radio telemetry access scenario, memory readout device 201 has transceiver capability via ground station radio equipment. Remote test aircraft preferably has aircraft radio communications equipment with direct access to serial data bus 213. Memory readout device 201 transmits a MRO request to remote aircraft radio communications 205. Aircraft radio communications 205 then places a MRO request directly on serial data bus 213.

For both scenarios, read access partition of flight computer 207 then receives a MRO request. Read access partition then builds a MRO response. If the request is a symbol, the requested symbol is translated to memory address. If the request is an address, the memory segment/range is read. Flight computer's 207 read access partition then places the MRO response on serial data bus 213. The MRO response is read from serial data bus 213. For the on-board device scenario, memory readout device 201 reads MRO request directly from serial data bus 213. For the radio telemetry access scenario, communications management partition of flight computer 207 routes the MRO response via serial data bus 213 to aircraft radio communications 205. The MRO response is received by ground station radio equipment. The MRO response is then read by memory readout device 201. For a latent storage scenario, the MRO response can be routed to mass storage device 209 for retrieval at a later time.

In an alternative embodiment, the output from the ARINC-653 compliant flight computer could be routed by some other wired non-serial transmission means, broadcast wirelessly, or the data could be routed for storage to a mass storage device for subsequent retrieval. In addition, the use of radio or satellite telemetry could be eliminated. The specification of the serial data bus could be changed. For example, the output bus could be modified to use a non-serial protocol if this were to become an Aeronautical standard.

Further, a variety of serial aircraft data busses could be used to facilitate the communication with the flight computer. The laptop-based interface could be ported for hosting on a traditional piece of airborne equipment such as an MCDU.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method for capturing flight test data from a flight computer, the method comprising:
    configuring a memory read out device to interface with the flight computer;
    issuing a request to the flight computer from the memory read out device, wherein the request comprises a symbol;
    translating the symbol into an address in the flight computer;
    building a memory read out response from the issued request; and
    transmitting the memory read out response to the memory read out device.

2. The method of claim 1 further comprising:
    issuing a next request to the flight computer from the memory read out device;
    building a next memory read out response from the issued next request; and
    transmitting the next memory read out response to the memory read out device.

3. The method of claim 1 further comprising displaying the memory read out response.

4. The method of claim 1 further comprising storing the memory read out response.

5. The method of claim 1 wherein configuring a memory read out device to interface with the local computer comprises a local interface.

6. The method of claim 1 wherein configuring a memory read out device to interface with the flight computer comprises physically connecting the memory read out device to the flight computer.

7. The method of claim 1 wherein configuring a memory read out device to interface with the flight computer comprises remotely connecting the memory read out device to the flight computer.

8. The method of claim 1 wherein issuing a request to the flight computer comprises issuing the request to the flight computer over a direct link.

9. The method of claim 1 wherein issuing a request to the flight computer comprises issuing the request to the flight computer over a communication link.

10. The method of claim 1 wherein building the memory read out response comprises reading a memory segment/range of the address in the flight computer.

11. The method of claim 1 wherein the step of transmitting comprises selecting a member from the group of air communications, ground communications, water communications, across 1 or multiple satellite communications, hard-wired communications, infrared microwave communications, radio frequency communications, UHF communications, VHF communications, low-bandwidth wireless communications, high-bandwidth wireless communications, short-distance RF communications and spread spectrum communications.

12. An apparatus for capturing flight test data from a flight computer, the apparatus comprising:
   a memory read out device configured to interface with the flight computer;
   a means for issuing a request to the flight computer from said memory read out device, wherein the issued request comprises a symbol;
   a means for translating the symbol into an address in the flight computer;
   a means for building a memory read out response from the issued request; and
   a means for transmitting said memory read out response to the memory read out device.

13. The apparatus of claim 12 further comprising a display for displaying the memory read out response.

14. The apparatus of claim 12 further comprising a memory for storing the memory read out response.

15. The apparatus of claim 12 wherein said memory read out device comprises a local interface.

16. The apparatus of claim 12 wherein said means for issuing requests comprises a direct link.

17. The apparatus of claim 12 wherein said means for issuing requests comprises a communication link.

18. The apparatus of claim 12 wherein said memory read out device is a notebook computer.

19. The apparatus of claim 12 wherein said interface with the flight computer comprises an interface to a read-access partition of the flight computer.

20. The apparatus of claim 12 wherein said memory read out request comprises an address in the flight computer.

21. The apparatus of claim 12 wherein said means for transmitting comprises a member selected from the air communications, ground communications, water communications, across 1 or multiple satellite communications, hard-wired communications, infrared microwave communications, radio frequency communications, UHF communications, VHF communications, low-bandwidth wireless communications, high-bandwidth wireless communications, short-distance RF communications and spread spectrum communications.

* * * * *

UNITED STATES PATENT AND TRADEMARK OFFICE
CERTIFICATE OF CORRECTION

PATENT NO.        : 7,584,032 B2                                                                 Page 1 of 1
APPLICATION NO.  : 10/979417
DATED             : September 1, 2009
INVENTOR(S)       : Bauman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1260 days.

Signed and Sealed this

Fourteenth Day of September, 2010

David J. Kappos
*Director of the United States Patent and Trademark Office*